United States Patent Office 3,024,079
Patented Mar. 6, 1962

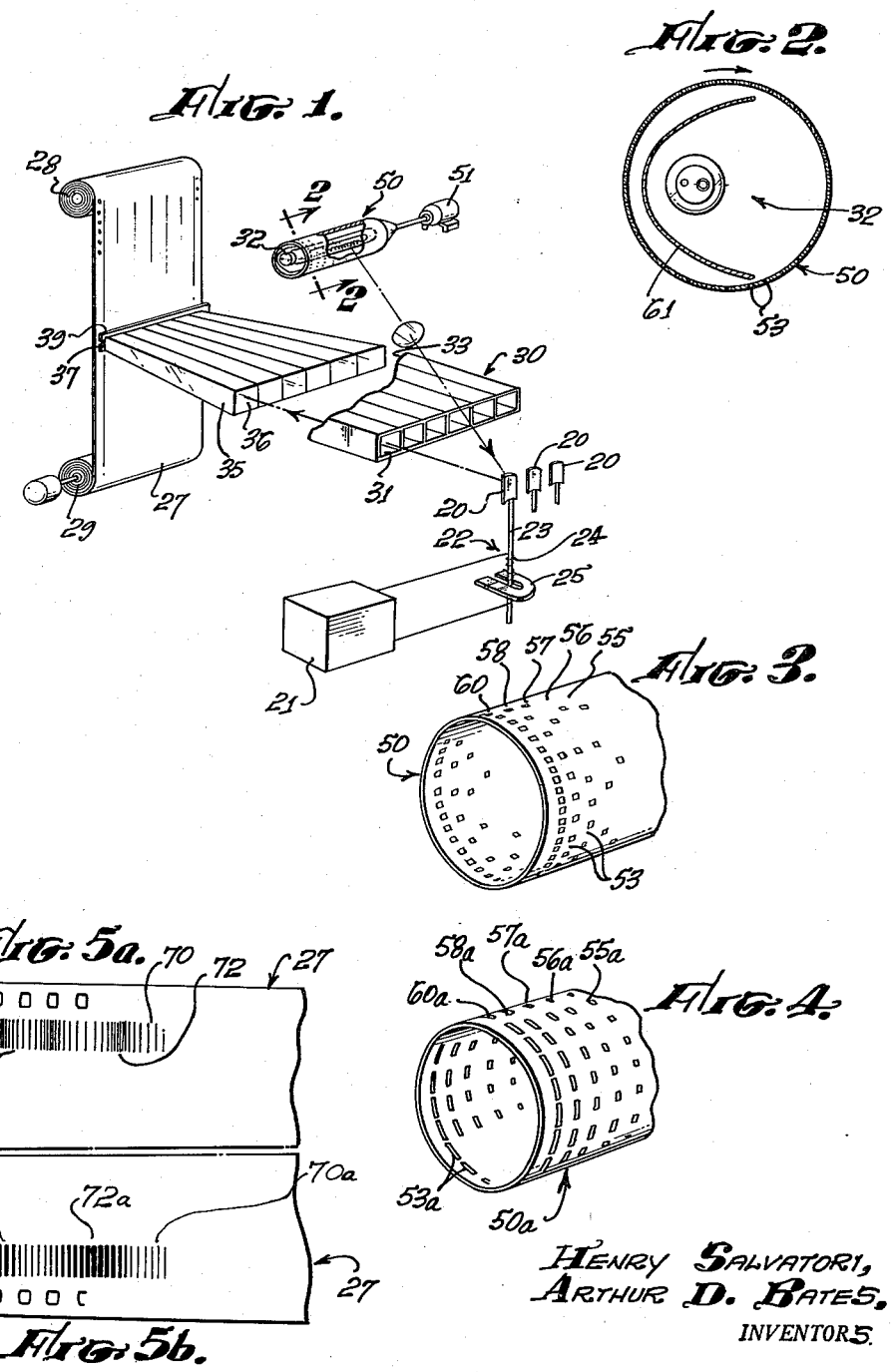

3,024,079
METHOD AND APPARATUS FOR OSCILLOGRAPH RECORDING
Henry Salvatori, Los Angeles, and Arthur D. Bates, North Hollywood, Calif., assignors to Western Geophysical Company of America, Los Angeles, Calif., a corporation of Delaware
Filed Jan. 21, 1959, Ser. No. 788,181
3 Claims. (Cl. 346—109)

The present invention relates to apparatus for making photographic records of transient signals and more particularly to an improved method and apparatus for forming a time scale record of such transient signals.

In many applications, such as seismographic surveying it is necessary to record the intensity of transient signals as a time scale record, such that the intensity of an input signal is clearly discernible from the record and that the record can be viewed as a meaningful whole. Various types of records are well known to the art as are various methods and means for forming such records.

As an illustrative application of the use of such records, seismic surveying can be briefly described and the present invention will be considered in connection therewith for purposes of clarity of description only. It is to be understood that the present invention is equally applicable to other arts and fields in which a time scale record of transient signal intensity is necessary or desirable.

Briefly, in making seismographic surveys by the reflection method, a seismic disturbance is initiated at a selected point on or adjacent the earth's surface and reflected seismic waves are detected at a plurality of points spread out in a selected pattern on the earth's surface. The seismic waves are detected by sensitive instruments which convert the seismic energy to electrical signals of comparable intensity. These electrical signals are amplified and recorded on a multi-channel recording apparatus, or seismograph in this application. It is with such recording that the present invention deals.

Depending on the recording method used, the seismograph records may be of the variable amplitude type, wherein the record is produced in the form of an oscillatory line whose amplitude of oscillation is proportional to the intensity of the electrical impulses which, in turn, vary in accordance with the intensity of a reflected wave at a seismometer.

Another well known type of seismograph record is the variable density type which is particularly advantageous to discern single events and to correlate a whole record. However, prior to the present invention, suitable and accurate variable density records have been difficult to obtain. Variable density records are produced by exposing a light sensitive recording medium to light, the intensity of which is proportional to the intensity of the signal being recorded. The most common method of the prior art for obtaining such a record has been to employ a specially made lamp whose light varies in brightness in relation to the voltage input to the lamp. The disadvantages of such a system are apparent in that a number of lamps must be used for multi-channel recordings, their response characteristics must be uniform, the size is restricted, and the recording film must be sensitive to the particular color of light generated by the special lamps. A further disadvantage of this system is the necessity for special cameras and amplifiers in addition to those used for other types of recording. It being advantageous to be able to produce several types of records with the same equipment. Although various methods of forming variable intensity seismographic records are known to the art, all possess certain disadvantages due primarily to the fact that balancing of light intensities and of the rates of light variation with respect to signal variation between adjacent channels is a difficult, time consuming and frequently recurring task. The characteristics of such systems generally vary in a severe manner with time. In addition, the variable shading is greatly affected by the quality of film developing in the chemical bath and by the characteristics of the film.

In general, a seismograph section should provide an overall representation of seismographic reflection energy reaching the surface of the earth at a sequence of spread locations. In addition, it is highly desirable that a range of energy levels be recordable and measurab'e and that correlative events be clearly identifiable when the record section is viewed as a whole, for example, by viewing it from a distance.

Accordingly, it is an object of the present invention to provide an improved means of oscillographic recording wherein an oscillographic record having the advantages of a variable density type record is produced.

It is another object of the present invention to provide an oscillographic recording similar to a variable density recording which obtains an improved density gradient of the record such that the variation of signal input is more clearly discernible.

It is another object of the present invention to provide a method and apparatus for a variable density seismograph record in which the density or darkness of a trace is not dependent upon the intensity of the light transmitted to the record.

It is another object of the present invention to provide a variable density recording oscillographic apparatus which can readily be biased to record only signals within a predetermined range of intensity.

A still further object of the present invention is to provide a method and apparatus for oscillographic recording of transient signals in which the intensity of the signal is recorded such that the recording is of constant amplitude and constant light intensity, while giving a visual impression of variable density.

Yet another object of the present invention is to provide a method and apparatus for seismograph recording in which a record similar to a variable density record is obtained, but which record is not affected by light path differences or by the quality of film or film developing of the record.

An additional object of the present invention is to provide a multi-channel variable density recording apparatus whose channels can be readily balanced and whose balance has a greatly reduced tendency to drift with time.

The present invention is an improved method and apparatus for forming variable density oscillographic recordings for recording transient input signals of variable amplitude in which the variable amplitude seismic signal is converted to a series of pulses of constant amplitude. The number of pulses per second or the time scale length of the pulse is proportional to the amplitude of the signal. The intensity of each vertical line in a recording trace is the same for all traces and a variable shading in a trace depends only on the number of lines per inch in accordance with one embodiment of the invention or the width of the line in accordance with an alternative embodiment of the invention.

More specifically, a presently preferred embodiment of an improved variable density recording oscillographic apparatus in accordance with the present invention includes a moving light sensitive recording medium such as a film and a galvanometer mirror which oscillates about an axis parallel to the direction of movement of the film record. The mirror oscillates in proportion to the intensity of the input signal to be recorded. A line of light is transmitted to the mirror and reflected therefrom through a light channel to the moving film. The line of light is transmitted as a pulse from a light source of constant intensity and means are provided for varying the frequency at which the pulsated lines of light are transmitted to the mirror or for varying the duration of the light pulse in accordance with the amplitude of the signal being recorded.

The novel features which are believed to be characteristic of the invention, both as to its apparatus and method of operation, together with further objects and advantages thereof will be better understood from the following description considered in connection with the accompanying drawing in which a presently preferred embodiment of the invention is illustrated by way of example. It is to be expressly understood, however, that the drawing is for the purpose of illustration and description only, and is not intended as a definition of the limits of the invention.

In the drawing:

FIGURE 1 is a partially diagrammatic view in perspective of a presently preferred form of a multi-channel recording apparatus in accordance with the present invention;

FIGURE 2 is a partial view taken along line 2—2 of FIGURE 1;

FIGURE 3 is a partial view in perspective of the light-pulsing drum utilized in the presently preferred embodiment;

FIGURE 4 is a view similar to FIGURE 3 of an alternative embodiment of the light-pulsing drum;

FIGURE 5a is an illustrative single-channel trace of a seismographic record obtained by the apparatus of FIGURE 1; and FIGURE 5b is an illustrative trace similar to that in FIGURE 5a using the pulsing drum of FIGURE 4.

Referring now to the drawing, there is shown in FIGURES 1, 2 and 3, a partially diagrammatic representation of the recording apparatus in accordance with the presently preferred embodiment of this invention. In FIGURE 1, a single galvanometer mirror 20 is shown in an illustrative multi-channel recorder having six channels. One mirror is shown for clarity, although similar mirrors and galvanometer apparatus will be positioned in each channel.

Again using a seismograph exploration apparatus as an illustrative application of the present invention, an amplifying unit 21 is electrically connected to the detector groups, not shown, to amplify the electrical impulses produced by the detectors upon the arrival at each detector of seismographic waves generated by an explosion at the shot point and reflected by the various underground formations as discussed hereinbefore.

It is to be expressly understood that although seismographic exploration is used as an application in which the present invention is particularly desirable, it is not limited thereto and can be used in any application of an oscillographic camera in which it is desirable to obtain a variable density record of transient signals.

The intensity of the electrical signal is transmitted from the detector group or other signal source through the amplifier 21 to a galvanometer 22 of the type well known to the art where it is impressed across the wire loop 24 of the galvanometer 22 to which a mirror is affixed and which is disposed in the field of a permanent magnet 25. Thus, the mirror 20 is rotated about a vertical axis by an amount proportional to an electrical impulse received at the galvanometer. The impulse is, in turn, proportional to the input signal, or in this application to a shock wave received at an individual detector group.

Referring now particularly to FIGURES 1 and 2, a plurality of oscillating mirrors 20 equal in number to the number of channels in the oscillographic camera are arranged in side by side relationship. Each mirror 20 is affixed to a vertical shaft 23 which in turn is affixed to the movable coil 24 of a galvanometer 22. The coil of each galvanometer is rotated within the permanent magnet 25 by an amount proportional to the electrical signal impressed upon it. In the embodiment shown in FIGURE 1, six channels are shown, thereby providing a multi-channel oscillographic camera in which six signals are recorded simultaneously in side by side relationship upon a six channel photographic record. The electrical signal transmitted to each galvanometer causes the respective mirror 20 to be rotated about a vertical axis through an arc which is proportional to the electrical signal impressed upon the coil and which will vary with varying intensity of the signal. The galvanometer and mirror are of the type well known to the art and are not shown or described in detail. The mirror, however, is preferably spherical to transmit a light band as described hereinafter.

Although a multi-channel oscillographic camera and recording system are described in detail throughout the specification, it is to be understood that the present invention can also be utilized in a single channel oscillographic camera.

The light sensitive recording medium such as photographic film 27 is positioned in a vertical plane substantially parallel to the plane of the vertical axes of the galvanometers 22 and at a substantial distance therefrom. The photographic film is mounted on an idler roll 28 and a driven roll 29 which is driven by a motor to move the film at a constant rate of speed in the vertical plane. The means for mounting and moving the photographic film are well known to the art.

A light source 32 is positioned with respect to the mirrors 20 such that light transmitted to each mirror is reflected toward the respective channel of the record. Thus, in this embodiment the light source 32 is positioned above the line of the mirrors 20 between the mirrors and the film 27. The light source is of the type which furnishes a band of light and is oriented horizontally with respect to the orientation of the apparatus. That is, a broad line filament lamp 32 of the type well known to the art is used in this embodiment and is oriented to transmit a horizontal band of light to the mirrors 20.

In accordance with the present invention means are provided in combination with the light source 32 for transmitting the light from the source to the mirrors 20 as pulses of light, which pulses are frequently modulated in proportion to the intensity of the signal received at the mirror 20. The light pulsing means of the presently preferred embodiment as shown in FIGURE 1 includes a pulsing drum 50 which surrounds the light source and is mounted for rotation about the light source. The drum is rotatable about a substantially horizontal axis and is driven at a substantially constant speed, as for example by a synchronous motor 51. The axis of rotation of the drum can be made to coincide with the axis of the light source to yield improved light transmission. The pulsing drum 50 has a series of circumferentially spaced openings therethrough through which light is transmitted from the light source to the mirrors 20. The construction and operation of the pulsing drum 50 will be described in greater detail hereinafter.

Referring again to the apparatus in general, a light channelizer 30 is positioned between the mirrors 20 and the film 27 in the path of the light reflected from the mirror. The channelizer comprises a series of channels 31 having opaque walls and so oriented that light transmitted from a given mirror can pass through only its respective channel. Thus, from the film end 33 of a given channel 31, only the mirror 20 corresponding to that channel can be seen. In the presently preferred embodiment as shown in FIGURE 1, since it is necessary to conduct lines of light having a constant amplitude and a constant light intensity to the film record 27, light conducting members 35 are used. That is, a light member 35 is positioned in each of the channels as shown in FIGURE 1 and all of the light members are similar except that the geometry of each will vary in connecting the end 33 of the channelizer 30 to the narrower width of the strip 27. The light member 35 is formed of light conducting material of the type well known such as methyl methacrylate resin, known by the trademark Lucite of E. I. du Pont de Nemours and Co. or acrylate and methacrylate resin, known by the trademark Plexiglas of Rohm and Haas Co., Inc. Each of the members 35 is of rectangular cross-sectional configuration which decreases along all sides of the rectangle from the channelizer end 36 to the film end 37 of the member. That is, the end area of each member at the light receiving end or channelizer end 36 is substantially equal to the area and configuration of the respective channel 31, while the light transmitting end or film end 37 is equal to the width of the channel on the film 27. The members 35 are convergent from the width of the channelizer to the width of a channel of the film while the height of each member is convergent from the height of the channelizer to a height convenient to the optical system at the film and the longitudinal geometry of each is determined accordingly. The light conductive member 35 will accordingly transmit light from the respective channel 31 of the channelizer 30 to the proper position on the film strip. In order to effect maximum transmission of light from the channel 31 to the film and to assure light transmission from only the proper channel, each of the light members 35 is isolated from the others by spacers or shims. Such spacers or shims are used as required by the configuration or geometry of the light members to prevent adjacent members from coming into contact with each other. Spacers are used at the film end 37 of the light members where the said members should be held tightly together.

Means are provided in the light conductive members 35 for diffusing light which passes through the member. In the presently preferred embodiment the channelizer end of the member 35 is frosted such that all light passing through the channelizer end of the member is diffused so as to be scattered through the entire cross-section of the member. The film end in this embodiment is polished to allow maximum light transmission. Thus, light admitted at the channelizer end 36 of the member 35 is emitted from the film 37 as a beam of light having a cross-sectional configuration equal to the configuration of the film end 37 of the member. A slit mask 39 is positioned between the light conductive members 35 and the moving film 27 to reduce the light beam from each member 35 to substantially a horizontal line of light. Alternatively, the light conducting members 35 can be tapered to a relatively narrow horizontal strip at the film end 37 and a condensing lens can be used in place of, or with the mask. The presence or absence of the line of light transmitted to the moving film record is accordingly determined by the presence or absence of light admitted to the channelizer end 36 of the member.

Accordingly, it can be seen that a beam of light transmitted from the light source 32 through the pulsing drum 50 to the mirror 20 and thus through the channelizer 31 and light conducting member 35 to the film strip 27 will be recorded as a line of light equal in width to the width of the light conducting member 35 at the film end 37 of the member. If the light conducted to the mirror 20 has a predetermined duration, it will be recorded upon the moving film strip 27 as an exposed area of proportionate time scale duration. If, on the other hand, the light transmitted to the mirrors 20 consists of pulses of light of a predetermined frequency and uniform short duration, it will be recorded upon the film strip as lines of exposure of uniform width, but at a spacing inversely proportionate to the frequency of the pulses transmitted to the mirror. Thus, referring to FIGURES 1, 2 and 3, in its presently preferred form, the pulsing drum 50 is a cylinder which surrounds the light source 32 and is formed of opaque material. Openings 53 are provided through the drum for transmission of light from the drum. The openings 53 are all of substantially uniform size and are arranged in longitudinally spaced circumferential series with an increased number of openings in each series progressing from one end of the drum. That is, a series of light openings which are uniformly circumferentially spaced are positioned at a predetermined longitudinal distance from each adjacent series of openings which are also uniformly circumferentially spaced at a greater and lesser circumferential spacing than the first series of openings. Thus, referring to FIGURE 3, all of the openings 53 in the drum are of substantially equal size, and in each circumferential series of openings, such as the series 60 furthest to the left in the figures, the openings are equally spaced about the circumference of the drum. The next series 58 is at a predetermined longitudinal spacing from the series 60 and the openings 53 are again equally spaced but fewer in number such that their circumferential spacing is greater. Similarly, at the same longitudinal spacing the next series 57 defines a lesser number and each succeeding series 56, 55 and so forth from left to right defines a decreasing number and thus a greater circumferential spacing. Means such as a synchronous motor 51 are provided for rotating the drum 50 at substantially constant speed about the light source 32 as an axis. An elliptic-cylinder mirror 61 is preferably mounted stationarily about the light source 32 for focusing the light in the surface of the drum. For proper focusing of the light the elliptic cylinder, drum and light filament are preferably so disposed that the filament lies substantially along one line of focus of the elliptic cylinder, the surface of the drum 50 passes through the other line of focus, and both lines of focus are substantially coplanar with the centers of the mirrors 20. Thus, if a mirror 20 sees the series 60 of light openings while the openings are being rotated at the constant speed, that mirror 20 will receive a series of light pulses at a frequency determined by the circumferential spacing between the openings 53 in the series 60 and the speed at which the drum is rotated. If, however, the mirror 20 sees the series 56, for example, and the drum is rotating at the same constant speed of rotation, it will again receive a series of pulses of light but at a lesser frequency than when the mirror 20 was "seeing" the openings in the series 60. Accordingly, the longitudinal spacing between the respective series of openings is determined such that the galvanometer mirror 20 for a given channel in the multi-channel apparatus can "see" one and only one series of openings at a time. That is, when the mirror 20 is rotated to the position at which it transmits light emanating from the light source 32 through the openings 53 in a circumferential series 57, for example, only the light pulses at the frequency determined from the series 57 are transmitted by the mirror 20 into the channelizer 31. Conversely, the longitudinal spacing is such that as the mirror rotates from the position at which it sees the series 57 to the position at which it sees the series 58, it will transmit only the series of pulses received from the series 57 until it has rotated to the position at which it transmits only the pulses received from the series 58.

Further clarification of the construction of the pulsing drum 50 may be had by considering the operation of the apparatus in connection with FIGURES 1, 2 and 3 and the seismograph record which is formed as shown in FIGURE 5a. Thus, as described hereinbefore, the position of the mirror 20 is determined by the signal transmitted to the galvanometer 22 by a signal such as a seismometer in the present illustrative embodiment. A signal transmitted to the galvanometer 22 from the signal amplifier 21 will cause the mirror 20 to rotate counter-clockwise in the figure as the signal becomes proportionally greater, and such rotation will be by an amount proportional to the signal intensity. With the apparatus in operation, the film drive motor is driving the film strip 27 downward at a uniform rate of speed to provide a time scale record of light signals received at the film. The motor 51 is also rotating the pulsing drum 50 at a uniform rate of rotation about the light source 32 which is energized and which, by means of the elliptic-cylinder mirror 61, is transmitting light towards the galvanometer mirrors 20 through the various openings 53 in the drum. The galvanometer can be biased to a predetermined threshold level such that at the zero-signal level the mirror 20 is positioned to "see" a predetermined series of openings or to see to the right of the first series of openings in FIGURE 1. As the signal intensity received at the galvanometer 22 reaches a predetermined threshold level, the galvanometer mirror 20 is rotated counter-clockwise to the position at which it sees the circumferential series of openings through the drum 50 which is furthest to the right of the drum in the figures, i.e., toward the motor 51. The number of openings in this first series of openings is minimal, such that a series of pulses are transmitted from the mirror 20 through the channelizer 30, the light members 35, and to the film strip 27 at a low frequency. That is, at a low signal intensity to the galvanometer mirror 20 the mirror "sees" a series of pulses emanating through the opening which is transmitted to the mirror at a low frequency proportional to the low intensity of the signal from the signal source through the amplifier 21. These low frequency signals are recorded as shown in the general area designated 70 in the seismograph record at FIGURE 5a. These signals are recorded as lines of constant intensity but at a relatively great spacing to signify the reception of a relatively weak signal at the galvanometer mirror 20. As the intensity of the signal being recorded increases, the galvanometer 22 causes the galvanometer mirror 20 to rotate counter-clockwise by an amount determined by the increased signal intensity. As the mirror 20 rotates counter-clockwise it sees a series of openings such as the series 57 in which the openings are much closer spaced circumferentially. Thus, the pulses transmitted through the series 57 to the mirror 20 will occur at a much higher frequency than those transmitted from the series to the right of the series 57. Accordingly, when the mirror 20 is rotated to the position at which it sees the series 57 it transmits a series of pulses to the film 27 at a higher frequency than before and the lines recorded upon the seismograph record shown in FIGURE 5a occur at closer spaced intervals as in the portion of the record designated as 71. At this point the lines which are recorded are again of the same intensity, but the spaces between the lines are much less, corresponding to the higher frequency at which they were transmitted to the film. Similarly, as a still greater signal is received and transmitted through the galvanometer to the mirror 20 causing it to move furthest counterclockwise to the position at which it sees the series 60, the frequency of the pulses transmitted from the mirror 20 to the film record 27 reaches a maximum and results in a very closely spaced group of lines such as the area 72 in the record of FIGURE 5a. Thus, the film record obtained by means of the apparatus of FIGURE 1 comprises a series of lines recorded upon the film which lines are of constant intensity, but of variable spacing, which spacing is determined by the frequency of the pulses transmitted to the film record. It should also be noted that the lines of exposure of the film record, in addition to being of constant intensity, are all of equal duration since the openings 53 through the drum are of uniform size. Thus, the variable density of the film rcoerd is achieved by causing the exposure lines forming the record to be spaced at closer intervals as the signal intensity increases and at greater intervals as the signal intensity decreases.

Referring now to FIGURES 4 and 5b, an alternative embodiment of the present invention is shown in which the pulsing drum is constructed to define pulses of varying duration rather than of varying frequency. That is, the drum 50a of the embodiment shown in FIGURE 4 is similar in construction and is mounted in the manner previously described. The openings, however, are again defined in circumferential series which are longitudinally spaced but the openings in this embodiment are not of uniform size. The number of openings in each series is equal to the number of openings in each of the other series, however, the openings are of a predetermined circumferential extent dependent upon the series in which they occur. That is, as shown in FIGURE 4, beginning from the left side of the drum in the figure, the openings are at equally spaced circumferential intervals and each opening is of a predetermined circumferential length. The series of openings 60a at the extreme left of the drum 50a are of the greatest circumferential extent with a very narrow opaque space between consecutive openings. Each series progressing to the right of the drum has the same number of openings 53a but the openings in each successive series are circumferentially shorter. Thus, the series 58a has the same number of openings 53a as in the series 60a but each opening is shorter than the opening in series 60a and the spacing between openings is greater. Similarly, at the same longitudinal spacing the next series 57a defines openings which are again circumferentially shorter than in the series 58a and so forth from left to right in the figure until the openings at the extreme right on the drum are little more than circumferential slits.

From the foregoing it can be seen that the light drum 50a when mounted as previously described will result in a seismograph record such as that shown in FIGURE 5b. That is, the apparatus is operated as previously described with the drum 50a utilized in the apparatus rather than the drum 50. The film is again moved at a constant speed and the drum 50a is rotated about the light source 32 and elliptic mirror 61 at a predetermined constant rate. A signal transmitted to the galvanometer 22 from the signal amplifier causes the mirror 20 to rotate counter-clockwise, and when a threshold level of signal intensity is reached the mirror 20 will "see" the circumferential series of openings through the drum 50a which is furthest to the right of the drum in the figures. Since the extent of the openings in this series is minimal, the pulses transmitted to the mirror and thence to the film strip are of short duration and will be recorded upon the film strip as narrow bands or lines of light which are equally spaced along the seismograph record as in the general area designated 70a in FIGURE 5b. As the signal intensity being recorded increases the mirror is rotated counterclockwise until it "sees" the series 57a, for example, in which openings 53a are of much greater circumferential extent. The light pulses received by the mirror and transmitted to the film strip will occur at the same frequency but will be of greater duration such that the seismograph record will show a series of broader bands of light occuring at the same intervals between centers but with less spacing between exposure band areas. Such signal intensity is recorded as shown generally in the portion of the seismograph record at 71a. As still greater signal intensity is transmitted through the galvanometer to the mirror 20 the mirror rotates until it "sees" the series 60a which transmits to the film record a series of pulses still at the same frequency but of very long duration to record on the seismograph record a series of broad exposure bands as shown at 72a in FIGURE 5b. Thus, the high intensity signal exposure area of the record the bands of exposure due to the pulses are very broad with very narrow spaces therebetween but with the same spacing between centers of the bands as in the other signal intensity portions. Thus, the variable density of the film record in FIGURE 5b is achieved by causing the exposure lines or bands to vary in width at constant frequency to give a greater area of exposure as the signal intensity increases and a lesser area of exposure as the signal intensity decreases.

Although the apparatus described above for obtaining variable density records such as shown in FIGURES 5a and 5b has been described with mechanical means for obtaining the proper light pulsing, electrical or electronic means can also be used. That is, in the embodiment which results in the record of FIGURE 5a the frequency of the light pulses is modulated as a function of the signal intensity by means of the pulsing drum 50. Suitable electrical circuitry well known to the art can be used to energize a glow tube at a frequency which is a function of the signal intensity, rather than using a constant light source 32 in combination with a drum to obtain pulsing. In a similar manner, in the embodiment which results in the record 56, the duration of the light pulses is modulated as a function of the signal intensity by means of the pulsing drum 50a. Suitable electrical circuitry, well known to the art, can be used to effect pulse-width modulation of the signal used to energize a glow tube rather than using a constant light source in combination with a drum to obtain pulsing.

As will be apparent to those skilled in the art, recordings such as those shown in FIGURES 5a and 5b can be photographically reversed either by photographing an original film or by using direct-positive film or recording paper as the recording film 27. By this means a record is produced which in the case of the frequency modulation embodiment of FIGURES 3 and 5a consists of white lines on a black background, while in the case of the pulse-width modulation embodiment of FIGURES 4 and 5b it consists of white zones of variable time-scale extent on a black background.

Alternatively, such reversed recordings can be produced with conventional negative film by substituting for the drums 50 and 50a, like drums of transparent material but with the openings 53 and 53a replaced by opaque zones whose dimensions and disposition are the same as those of the said openings.

Other means than the rotating drum for interrupting the light from a light source can be provided without departing from the spirit of the invention. For example, a commutating switch can be used to control an electric circuit which will periodically interrupt the power to the light source. Further, other frequency modulation means than those disclosed in connection with the drum having openings of various sizes or a variable number of openings of a given size can be provided. One alternative frequency modulation means can be an eccentric or a cam driven by a motor which controls the interruption means circuit above mentioned.

Thus, the present invention provides a method and apparatus for producing an improved seismograph record similar to a variable density record in which the darkness or density of the trace is not dependent upon the intensity of the light transmitted to the record and which is not affected by light path differences or by the quality of film or film developing.

What is claimed is:

1. Apparatus utilizing an elongated light source for forming an oscillographic recording of transient input signals upon a moving light sensitive medium comprising: a light sensitive medium, means for moving said light sensitive medium, a mirror, means for oscillating said mirror through an angle determined by the intensity of said input signal; said light source and said mirror being so positioned that light is reflected from different elongate positions of said source by said mirror at different angular positions thereof to a recording channel of said medium; a pulsing drum surrounding said elongate light source, said pulsing drum being formed of opaque material and defining a plurality of longitudinally spaced series of openings therethrough, through which light is transmitted in pulses to said mirror and said recording channel, each of said series of openings being circumferentially spaced with an increased circumferential space between openings in each successive series; and means for rotating said drum at a substantially constant rate of speed about said light source.

2. Apparatus utilizing an elongated light source for forming an oscillographic recording of transient input signals upon a moving light sensitive medium comprising: a light sensitive medium, means for moving said light sensitive medium, a mirror, means for oscillating said mirror through an angle determined by the intensity of said input signal; said light source and said mirror being so positioned that light is reflected from different elongate positions of said source by said mirror at different angular positions thereof to a recording channel of said medium; a pulsing drum surrounding said elongate light source, said pulsing drum being formed of opaque material and defining a plurality of longitudinally spaced series of openings therethrough, through which light is transmitted in pulses to said mirror and said recording channel, each of said series of openings having equally circumferentially spaced openings of substantially uniform size, each longitudinally spaced series of said plurality having a lesser number of openings than the preceding series; and means for rotating said drum at a substantially constant rate of speed.

3. Apparatus utilizing an elongated light source for forming an oscillographic recording of transient input signals upon a moving light sensitive medium comprising: a light sensitive medium, means for moving said light sensitive medium, a mirror, means for oscillating said mirror through an angle determined by the intensity of said input signal; said light source and said mirror being so positioned that light is reflected from different elongate positions of said source by said mirror at different angular positions thereof to a recording channel of said medium; a pulsing drum surrounding said elongate light source, said pulsing drum being formed of opaque material and defining a plurality of longitudinally spaced series of openings therethrough, through which light is transmitted in pulses to said mirror and said recording channel, each of said series of openings having equally circumferentially spaced openings of substantially equal circumferential extent, each longitudinally spaced series of said plurality having openings equal in number but of less circumferential extent than the preceding series; and means for rotating said drum at a substantially constant rate of speed.

References Cited in the file of this patent

UNITED STATES PATENTS

| 1,597,726 | D'Albe | Aug. 31, 1926 |
| 1,862,327 | Bagno | June 7, 1932 |
| 1,907,549 | Kahrs | May 9, 1933 |
| 1,990,023 | Eremeeff | Feb. 5, 1935 |
| 2,031,764 | Eremeeff | Feb. 25, 1936 |
| 2,629,778 | Potter | Feb. 24, 1953 |
| 2,726,131 | Skelton | Dec. 6, 1955 |
| 2,769,683 | Skelton | Nov. 6, 1956 |
| 2,783,118 | Owen | Feb. 26, 1957 |
| 2,791,288 | Meier | May 7, 1957 |
| 2,871,088 | Abell | Jan. 27, 1959 |
| 2,875,017 | Reynolds | Feb. 24, 1959 |